No. 619,259. Patented Feb. 7, 1899.
B. W. MORFOOT.
DIE FOR CUTTING AND SHAPING CAN HEADS.
(Application filed Aug. 22, 1898.)
(No Model.) 4 Sheets—Sheet 1.

Witnesses: Inventor
Benjamin W. Morfoot
by Rudolph Wm. Lotz Atty.

THE NORRIS PETERS CO., PHOTO-LITHO., WASHINGTON, D. C.

No. 619,259. Patented Feb. 7, 1899.
B. W. MORFOOT.
DIE FOR CUTTING AND SHAPING CAN HEADS.
(Application filed Aug. 22, 1898.)
(No Model.) 4 Sheets—Sheet 2.
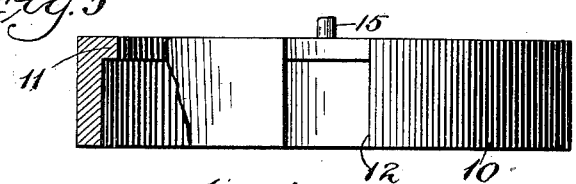
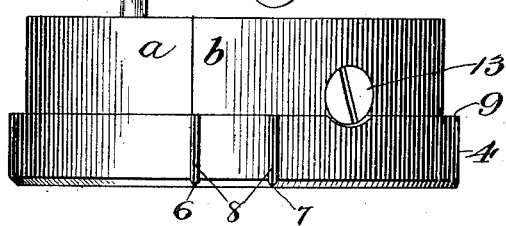
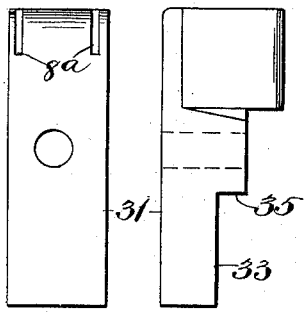
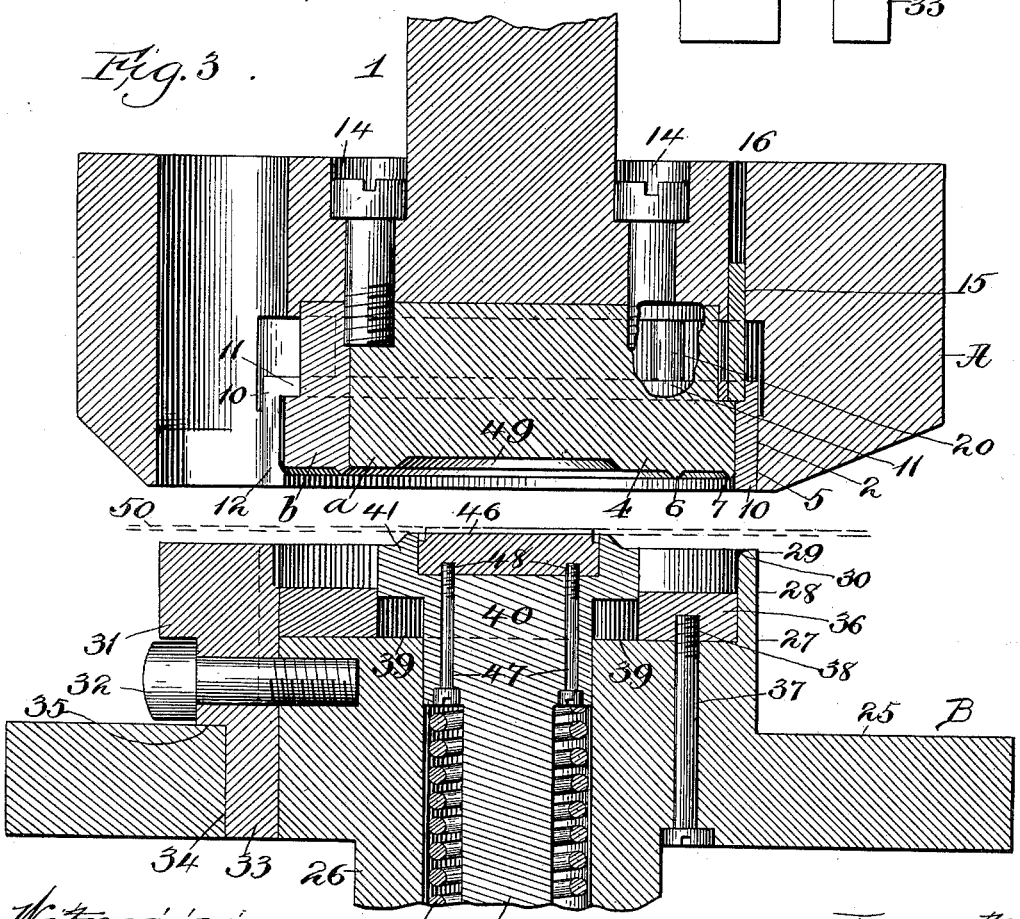

No. 619,259. Patented Feb. 7, 1899.
B. W. MORFOOT.
DIE FOR CUTTING AND SHAPING CAN HEADS.
(Application filed Aug. 22, 1898.)
(No Model.) 4 Sheets—Sheet 3.
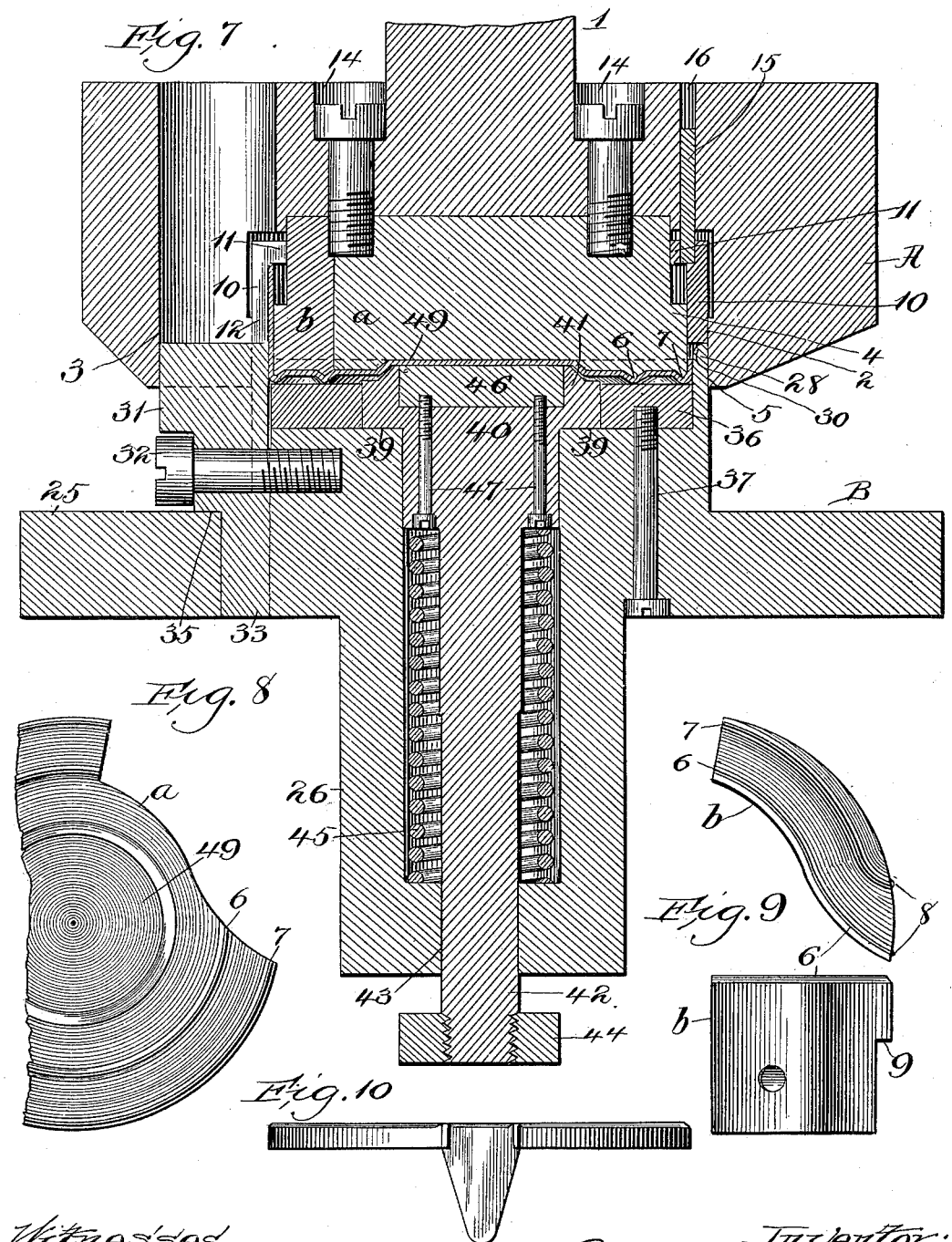

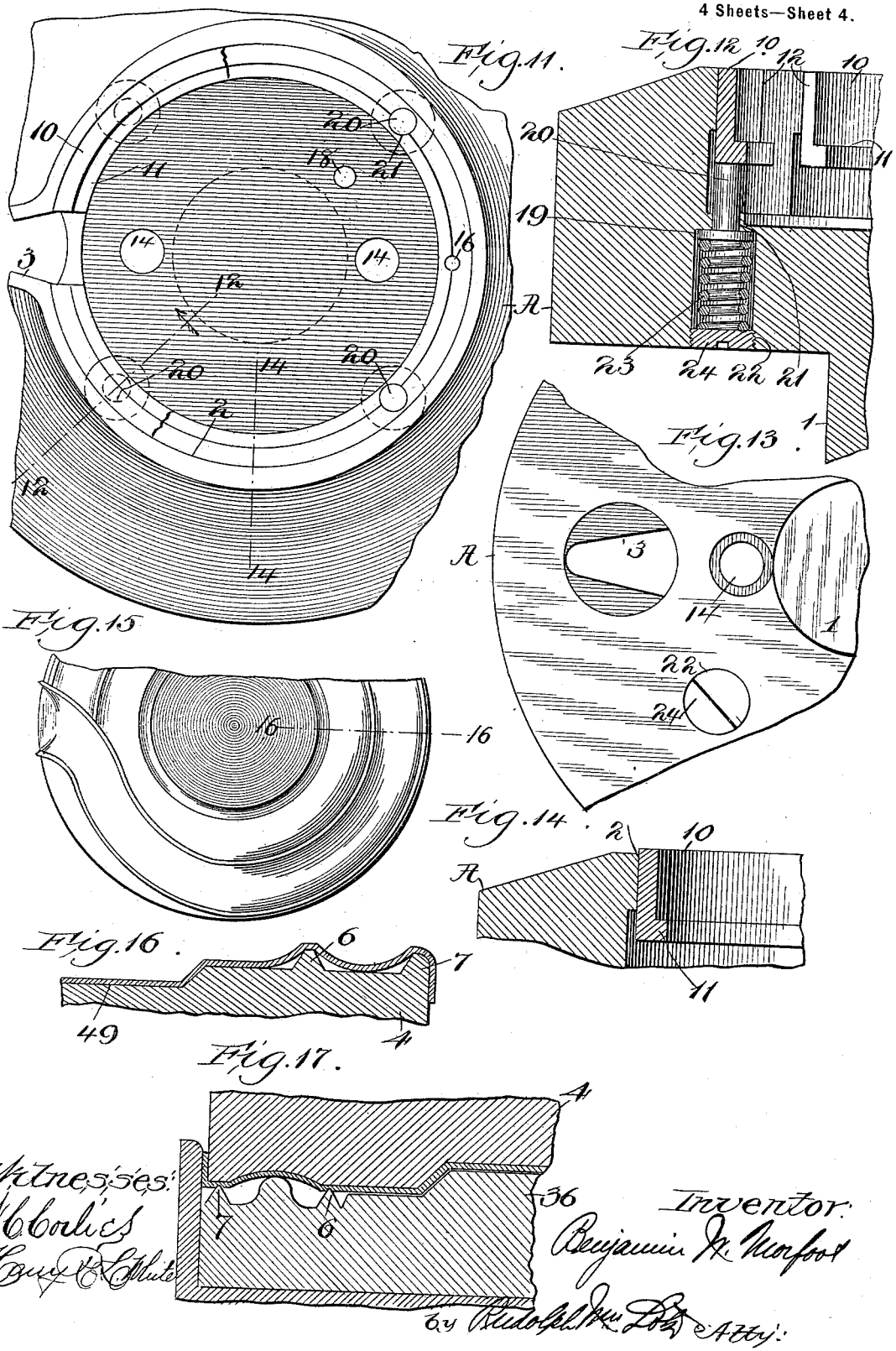

UNITED STATES PATENT OFFICE.

BENJAMIN W. MORFOOT, OF CHICAGO, ILLINOIS, ASSIGNOR OF ONE-HALF TO HUGO ZIEGFELD, OF MOUNT VERNON, NEW YORK.

DIE FOR CUTTING AND SHAPING CAN-HEADS.

SPECIFICATION forming part of Letters Patent No. 619,259, dated February 7, 1899.

Application filed August 22, 1898. Serial No. 689,178. (No model.)

*To all whom it may concern:*

Be it known that I, BENJAMIN W. MORFOOT, a citizen of the United States, residing at Chicago, in the county of Cook and State of Illinois, have invented certain new and useful Improvements in Dies for Cutting and Shaping Can-Heads; and I do hereby declare the following to be a full, clear, and exact description of the invention, such as will enable others skilled in the art to which it appertains to make and use the same.

My invention relates to a novel construction in a die for cutting and shaping can-heads, and more particularly for cutting and shaping key-opening can-heads such as form subject of Letters Patent No. 606,471, granted to me June 28, 1898, the object being to provide a die which will form a complete can-head with a single operation and which will be capable of a large number of operations in a given time; and it consists in the features of construction and combinations of parts hereinafter fully described and claimed.

Figure 1:
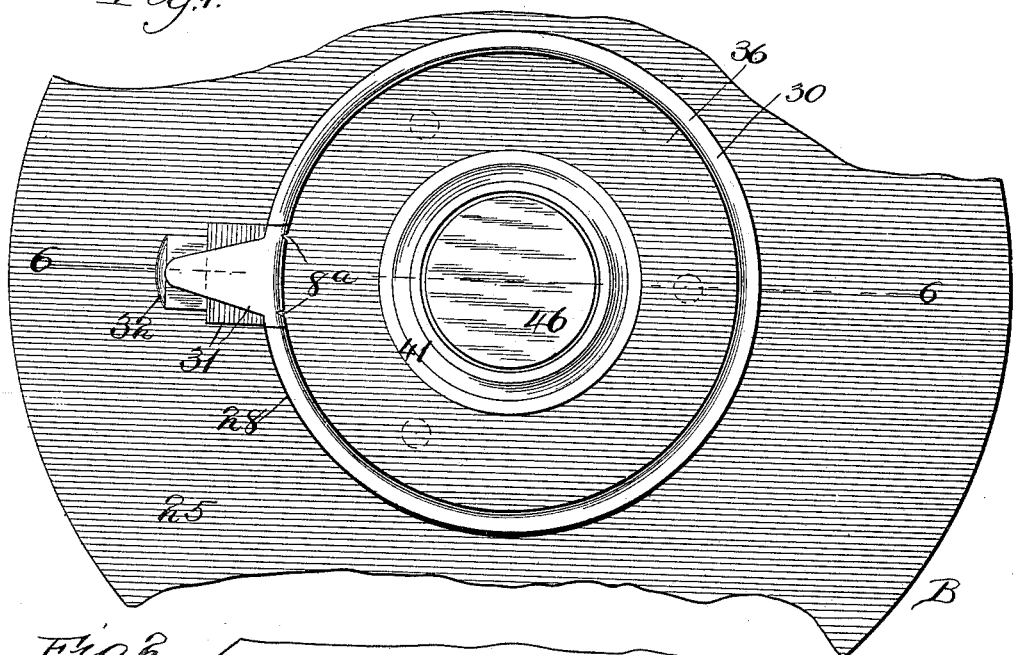
Figure 2:
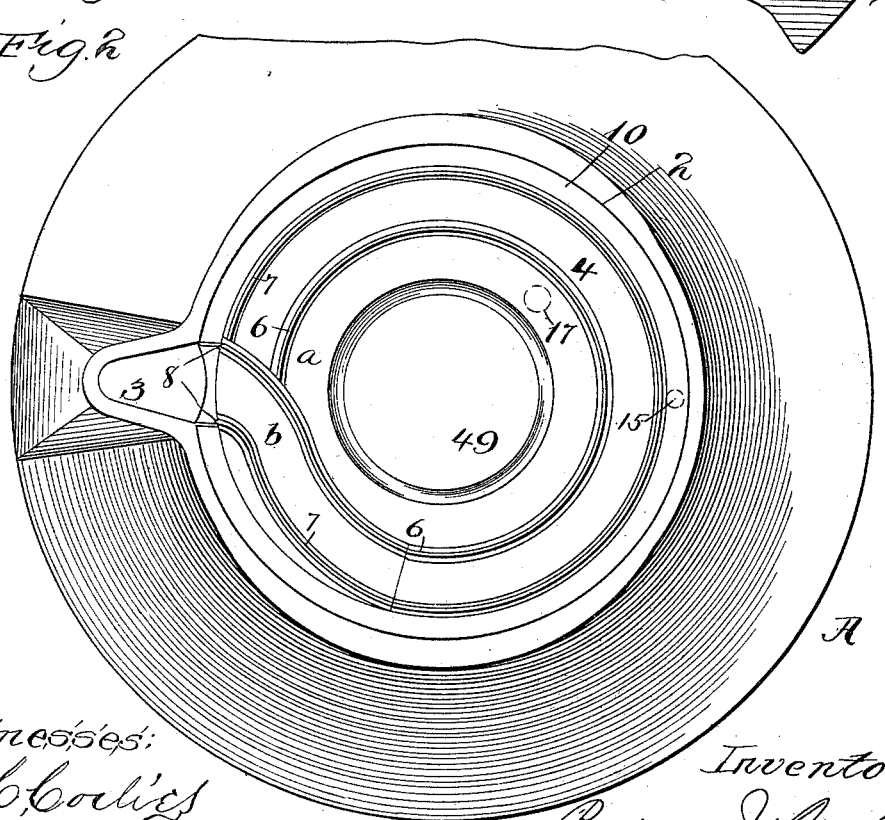

In the accompanying drawings, illustrating my invention, Figure 1 is a top plan view of the lower or male member of the die. Fig. 2 is a bottom plan view of the upper or female member of the die. Fig. 3 is a central vertical section through both members of the die in position for operation. Fig. 4 is a detail side elevation of a member of the female member of the die, which is provided with ridges for forming the weakened lines in the metal. Fig. 5 is a detail view, partially in elevation and partially in section, of the stripper surrounding the member shown in Fig. 4. Fig. 6 comprises two views in elevation of a member of the male member, which is adapted to form the projecting tongue which forms the termination of the removable strip. Fig. 7 is a central vertical section similar to Fig. 3, but showing the members in the position in which the can-head is completed and showing a completed can-head therein. Fig. 8 is a bottom plan view of the block shown in Fig. 4 with the portion thereof which forms the deflected portions of the weakening-lines removed. Fig. 9 shows said portion forming the deflected portion of the weakening-lines in bottom plan view and in interior elevation. Fig. 10 shows an end elevation of the tongue side of the completed can-head. Fig. 11 shows a bottom plan view of the male member with the block shown in Fig. 4 removed and the stripper shown in Fig. 5 in place and partially broken away. Fig. 12 is a detail sectional view on the line 12 12 of Fig. 11, looking toward the tongue-recess and with the block shown in Fig. 4 removed and reversed in position to conform to Fig. 11. Fig. 13 is a fragmentary top plan view of the female member. Fig. 14 is a detail sectional view on the line 14 14 of Fig. 11. Fig. 15 is a fragmentary bottom plan view showing a completed can-head over the block shown in Fig. 4. Fig. 16 is a fragmentary sectional view, on an enlarged scale, on the line 16 16 of Fig. 15. Fig. 17 is a fragmentary sectional view showing a modified construction of the die to form the weakened lines in the upper instead of the lower face of the can-head when such can-head is to be used for preserving acidulous substances which would be likely to eat through untinned metal.

In my present construction I have reversed the general relative position of the members by placing the female member above the male member, having found that the usual relative position is highly disadvantageous owing to the fact that the tongue and flange on the completed can-head when pointing downward so frequently caught in recesses in the lower member as to prevent them from dropping out of the die without the aid of the operator, and thus greatly delaying the latter in his work. This disadvantage was heretofore so great that it reduced by a very large percentage the number of can-heads which could be made by the operator in a given time, and by this transposition of the members I am enabled to make just as many key-opening can-heads in a given time as ordinary can-heads, thus saving a very great percentage of the cost of the labor. This relative transposition of the members also involves numerous other difficult changes in construction, which, aside from the primary difficulties involved in the formation of a key-opening can-head, have up to this time made it impossible to construct a die which will do the same amount of work as the dies usually employed in making ordinary can-heads.

Referring now to said drawings, A indicates the upper or female member of the die, and B the lower or male member thereof. Said member A consists of a solid block of metal provided with a shank 1, by means of which it is firmly secured to the press-plunger, and in its lower face with a recess 2 of the size and shape of the can-head blank, such recess being provided with an extension 3 at one point adapted to receive the tongue portion of the blank. Mounted within said recess 2 is a block 4 of less diameter than said recess and having its edges parallel therewith, the space 5 between said block and the walls of the recess determining the width of the flange on the can-head. Said block 4 is devoid of any extension to enter the extension 3 of the recess 2. Said block 4 is provided on its lower face with concentric shoulders 6 and 7, extending entirely around the same and deflected inwardly at one point and then outwardly to the edge of said block and thence downwardly on said block, as at 8, to a distance coinciding to the width of the flange on said cover, such shoulders being adapted to compress the metal in said cover to thin and weaken it on certain lines. Said block 4 is reduced in size at its upper end, so as to form an annular shoulder 9 thereon, which is adapted to limit the downward motion of the stripper 10, said stripper comprising a ring whose thickness along its lower end coincides with the width of the space 5, in which it is adapted to move and which at its upper end is provided with an annular inwardly-extending projection 11, coinciding in width with the shoulder 9, which it is adapted to engage. Said stripper 10 is cut away, as at 12, and said cut-away portion coincides in width with and is adapted to form a continuation, so to speak, of the extension 3 of said recess 2. Said block 4 is built up of two portions $a$ and $b$, said portion $a$ carrying the annular portions of the shoulders 6 and 7 and said portion $b$ carrying the deflected portions of said shoulders. Said portion $b$ is secured to said portion $a$ by means of a countersunk screw 13. Said block 4 is secured to said member A by means of screws passing downwardly through openings 14 in said member A and entering screw-threaded openings in said block. A pin 15 on said block 4, entering an opening 16 in said member A, serves to primarily adjust the stripper 10 to its proper position. The block 4 is primarily adjusted by means of the pin 17 thereon, which enters the opening 18 in said member A. Said stripper is actuated and normally held at the lower limit of its movement by means of plungers 19, having shanks 20, passing through small openings 21 in said member A and bearing against said stripper, the enlarged ends of said plungers fitting in the enlarged upper ends 22 of said openings 21, in which springs 23 are mounted, which bear at one end against said enlarged ends of said plungers and at their other ends against screw-caps 24, fitting within the upper screw-threaded ends of said openings 22. Said member B comprises a solid block of metal turned out to form the plate 25, the hollow shank 26, and the upper central annular projecting portion 27, which is bordered by an annular upwardly-extending flange 28, having a sharp outer or cutting edge 29 and an inner rounded or flanging edge 30. Said flange 28 is adapted to fit snugly within the recess 2 of the member A and to fit over the block 4, which it receives, the difference between the outer diameter of the block 4 and the inside diameter of the flange 28 being equal to the thickness of the metal operated upon. Said flange 28 is partially cut away and the enlarged portion 27 below said flange recessed to receive a block 31, coinciding in shape with and adapted to enter said extension 3 of said recess 2 in the member A, said block and recess providing the means for cutting out the tongue portion of the can-head. The inner face of said block 31 is flush with the inner face of the flange 28 and is rounded off on its inner edge the same as said flange, so that it likewise forms a portion of the flanging member. Said block 31 is provided on its inner face adjacent its upper edge with grooves $8^a$, which coincide in position with the shoulders 8 on the block 4 and in coaction with said shoulders are adapted to form weakened lines in the flange of the can-head. The weakened lines thus formed differ from the weakened lines formed by the shoulders or ridges 6 and 7, inasmuch as the metal is not cut, but is drawn to form V-shaped bends which weaken the metal sufficiently to enable it to be easily torn through the flange. Said block 31 is secured in place by means of a screw 32, entering said enlarged portion 27 of said member B, and by means of its shank 33, which enters the opening 34 in the member B. Said shank 33 is of smaller dimension than the remaining portion of said block 31, thus forming a shoulder 35 on said block, which rests upon the plate 25, and thus relieves the screw 32 of strain. Mounted upon said enlarged portion 27 of said member B and fitting snugly within the same is a steel ring 36, rigidly held in place by means of screws 37, passing upwardly through said member B and entering the screw-threaded recesses 38 in said ring. The central opening in said ring 36 is larger than the opening in the shank 26 and concentric therewith, whereby a shoulder 39 is formed interiorly of said ring, by means of which the downward movement of the movable member 40 of said member B is adapted to be limited. Said member 40 comprises a plunger 41, longitudinally movable within said opening in said shank 26 and provided with a shank 42, extending downwardly from said plunger and passing through the smaller opening 43 in the lower end of said shank 26. Said shank 42 is screw-threaded on its lower projecting end to receive a nut 44, adapted to serve as a collar to limit the upward movement of said plunger 41. A spring 45 is interposed between the plunger 41 and the lower end wall of said shank 26 and surrounding said shank 42, said spring being adapted to normally hold said plunger 41 at the upper limit of its movement. A head or die 46 is rigidly mounted upon the upper face of said plunger and is held in place by means of the screws 47, passing through said plunger 41 and entering the screw-threaded recesses 48 in said head 46. Said head 46 is of greater diameter than said plunger 41 and fits snugly within said ring 36 and serves the double purpose of aiding in the formation of the can-head by forming the central depression therein, together with the central recess 49 in said block 4, and of a stripper for forcing the completed can-head out of said member B.

The operation of the die is as follows: The members A and B being properly mounted in a press, a sheet 50 of tin or other metal is placed between said members and the press then actuated to force the member A down upon the member B. The primary action will be to cut out a blank from the metal which coincides in shape with the recess 2 with its extension 3, the extension thus formed on the can-head forming a tongue. The member A then continues to move downwardly until the blank rests upon the block 4. The inner rounded edge of the flange 28 then bends said blank over the edge of the block 4 and forms the flange on the can-head and simultaneously forces the tongue upward, so that it forms an integral part of such flange, and at the same time presses said flange inwardly against the shoulder 8 of the block, thus forming the weakened lines in said flange. Before said flange is completed and at nearly the end of the downward stroke of the member A the head or die 41 is forced upon its shoulder, and its further downward movement being thus prevented it begins to force the metal into the recess 49 in said block 4 to form the central depression in the can-head. Before this depression is entirely completed the metal will have come into contact with the ring 36, and the final action on the downward stroke will be that the shoulders 6 and 7 will partially embed themselves into the metal, and thus spread and weaken the same along such lines, and simultaneously the central depression and flange will be completed. During such downstroke and while forming the flange the stripper 10 is forced upwardly, and when said flange is completed said stripper bears against its edge. During the upstroke of the member A the stripper 10 forces the completed can-head out of the recess 2, while the head or die 46 forces it out of the recess within said flange 28, so that when said upstroke has been completed the can-head is entirely free and, owing to the incline of the bed-plate and plunger of all modern presses, will fall out.

It will be noted that by forming the recess 12 in the stripper 10 I enable the tongue to be bent simultaneously with the flange, and said tongue is at no time subjected to any pressure from said stripper, as is the case in dies in which no recess is provided to receive the tongue. In such cases the stripper must obviously be forced inwardly to an extent equal to the length of the tongue and will bear only on the latter, thus obviously canting the head and incurring the liability of bending the tongue when the stripper acts to eject the head. By means of the recess provided in my stripper I overcome this objection and bring all the pressure to bear upon the flange.

I claim as my invention—

1. In a die for cutting and shaping can-heads, an upper female member provided with a recess, a lower member adapted to fit said recess to cut a can-head blank provided with a tongue portion, a block within said recess in said female member provided with shoulders adapted to form weakening-lines in said can-head, a recess in said male member adapted to receive said block and bend the flange and tongue over on the same, a ring-stripper surrounding said block and cut away to receive the tongue when bent over, whereby the stripper strain is limited to the flange of the can-head, and a stripper on said male member, substantially as described.

2. In a die of the kind specified, a female member provided with a recess having an extension to form a tongue portion on the blank, a block within said recess conforming in general outline with said recess but devoid of a tongue portion, a stripper movable between said block and the inner wall of said recess, and a recess in said stripper conforming in width with the inner end of said tongue portion and located opposite same, whereby, when said tongue is bent, it enters said recess in said stripper and is relieved of any pressure from said stripper, substantially as described.

3. In a die of the kind specified, the combination with the cutting members adapted to cut a blank having a projecting tongue portion, of the bending members comprising a block in the female member devoid of a tongue portion, and a recess in the male member adapted to receive said block and thereby bend the metal over said block to form a flange of which said tongue forms a part, and a stripper surrounding said block and cut away opposite the tongue-cutting members to receive said tongue whereby said tongue is relieved of pressure from said stripper, substantially as described.

4. In a die of the kind specified, the combination with the cutting members adapted to cut a blank having a projecting tongue portion, of bending members adapted to flange the blank cut by said cutting members and bend the tongue thereon simultaneously with said flange, said members comprising a block devoid of a tongue member, and a recess conforming in shape with and adapted to receive said block to form the flange of which said tongue forms a part, and a stripper around said block provided with a recess adapted to receive said tongue, whereby the latter is relieved of any pressure from said stripper, substantially as described.

5. In a die of the kind specified, the combination with cutting members adapted to cut a blank having a projecting tongue portion, of bending members adapted to flange said blank and bend said tongue, said members being provided with shoulders adapted to form weakening-lines in the plane portion of said head, and shoulders on one of said members adapted to coact with recesses on the other thereof, to form weakening-lines in said flange to extend from the weakening-lines in the plane portion of said head to said projecting tongue, substantially as described.

6. In a die of the kind specified, a lower rigid male member and an upper movable female member provided with the punch and recess, respectively, to cut a blank provided with a tongue portion, a recess in said punch, a block in the recess of the female member adapted to enter said recess in said punch to form a flange on said blank, shoulders on said block and a plate in the recess of said punch adapted to coact to form weakened lines in said flanged blank and complete the can-head, an opening in said plate in said recess of said punch adapted to receive a spring-actuated member forming a stripper to force said can-head out of said recess in said punch, a stripper surrounding said block in said female member and adapted to bear against the flange on said can-head to force the same out of said female member, and a recess in said stripper adapted to receive the tongue of said can-head, whereby the stripping strain is limited to the flange of said can-head, and the tongue thereof remains free, substantially as described.

In testimony whereof I affix my signature in presence of two witnesses.

BENJAMIN W. MORFOOT.

Witnesses:
RUDOLPH WM. LOTZ,
ERWIN J. LOTZ.